(12) United States Patent
Lewis et al.

(10) Patent No.: US 7,366,731 B2
(45) Date of Patent: Apr. 29, 2008

(54) TROUBLE TICKET ASSIGNMENT

(75) Inventors: Richard Gregory Lewis, Newnan, GA (US); Randy S. Young, Lawrenceville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 502 days.

(21) Appl. No.: 10/734,681

(22) Filed: Dec. 12, 2003

(65) Prior Publication Data

US 2005/0131943 A1   Jun. 16, 2005

(51) Int. Cl.
*G06F 7/00* (2006.01)
*G06F 17/00* (2006.01)

(52) U.S. Cl. .................. 707/104; 707/10; 707/201; 705/9

(58) Field of Classification Search ............ None
See application file for complete search history.

(56) References Cited

U.S. PATENT DOCUMENTS

| | | | |
|---|---|---|---|
| 5,265,006 A * | 11/1993 | Asthana et al. ............. 705/8 |
| 6,216,109 B1 * | 4/2001 | Zweben et al. ............. 705/8 |
| 6,370,231 B1 | 4/2002 | Hice ...................... 379/32.01 |
| 6,389,426 B1 * | 5/2002 | Turnbull et al. ............. 707/102 |
| 6,415,259 B1 * | 7/2002 | Wolfinger et al. ............. 705/8 |
| 6,434,568 B1 * | 8/2002 | Bowman-Amuah ..... 707/103 R |
| 6,480,749 B1 | 11/2002 | Lee, Jr. et al. ............. 700/32 |
| 6,516,055 B1 | 2/2003 | Bedeski et al. ............. 379/32.01 |
| 6,735,293 B2 * | 5/2004 | Doherty et al. ............. 379/201.12 |
| 6,763,333 B2 * | 7/2004 | Jones et al. ............. 705/8 |
| 6,891,937 B1 * | 5/2005 | Kuhn et al. ............. 379/112.01 |
| 6,983,037 B2 * | 1/2006 | Argo ...................... 379/15.03 |
| 7,006,603 B2 * | 2/2006 | Boetje et al. ............. 379/9.03 |
| 2001/0051890 A1 * | 12/2001 | Burgess ...................... 705/9 |
| 2003/0028676 A1 * | 2/2003 | Pangrac et al. ............. 709/250 |
| 2004/0117470 A1 * | 6/2004 | Rehm ...................... 709/223 |
| 2004/0158762 A1 * | 8/2004 | Abraham, Jr. ............. 714/1 |
| 2004/0177271 A1 * | 9/2004 | Arnold et al. ............. 713/201 |
| 2004/0234043 A1 * | 11/2004 | Argo ...................... 379/15.03 |

OTHER PUBLICATIONS

"Quality-of-Service and Market Implications of Asymmetric Standards in Telecommunications", by Micael Clements, The National Regulatory Research Institute, Oct. 1998.*

* cited by examiner

*Primary Examiner*—Tim Vo
*Assistant Examiner*—Jay A Morrison
(74) *Attorney, Agent, or Firm*—Thomas, Kayden, Horstemeyer & Risley, LLP

(57) ABSTRACT

A trouble ticket handling system is provided. The system typically includes a login logic, a monitoring device, and a user interface logic. The login logic typically operates to log a user into several trouble ticket systems. The monitoring device typically polls the trouble ticket systems for open trouble tickets. The user interface logic enables the user to automatically load a proper trouble ticket from any of the open trouble tickets in the trouble ticket systems. Methods and other systems are also provided.

40 Claims, 8 Drawing Sheets

TROUBLE TICKET ASSIGNMENT

TECHNICAL FIELD

The present disclosure is generally related to telecommunications and more particularly to handling trouble tickets for telecommunications companies.

DESCRIPTION OF THE RELATED ART

Telecommunications companies (telcos) are typically run under tight regulation by federal and state agencies. These regulations affect many details of the telecommunications business, from inventory to customer service. Typically the regulations relate to taxes, competition, repairs, etc. and are punishable by fines and other penalties.

One area of regulation in customer service relates to trouble ticket handling. Trouble tickets typically occur when a customer calls in to a business repair center (BRC) and places a service request. In particular the federal communication commission and state public service commissions typically require these trouble tickets to be closed within a certain period of time. Typically, the agencies require a telco to report the resolution of these trouble tickets as an average period of pendency for open trouble tickets. This average is typically calculated monthly, and fines can be levied by federal and state agencies when the average pendency of trouble tickets exceeds a certain threshold. The thresholds and fines are typically set by each state's public service commission.

Traditionally, in the telco industry the BRC enters the trouble ticket into a Work Force Administration/Control (WFA/C) program. WFA/C is a trouble ticket logging and tracking program from Telcordia Technologies, Inc. of Piscataway, N.J. The BRC then performs a handoff to a Work Force Administration/Dispatch In or Dispatch Out (WFA/DI or WFA/DO) program (both also from Telcordia Technologies, Inc. of Piscataway, N.J.), depending on the type of problem the customer is reporting, and according to a job aid methods and procedures document. The WFA/DI program is typically used for internal trouble tickets, while the WFA/DO system is used for outside plant trouble tickets. Moreover, the WFA/DI system is broken down into regions. Each central office (CO) then retrieves trouble tickets from the WFA/DI system that serves the CO area. However, there are also centers, such as a Network Infrastructure Service Center (NISC), which are required to serve each of several regions. The NISC in particular is typically required to search each of the regional systems for information related to the NISC and choose the appropriate trouble ticket. This process can be time consuming and inefficient. Therefore, there is a need for systems and method that address these and/or other perceived shortcomings of the prior art.

SUMMARY OF THE DISCLOSURE

One preferred embodiment, among others, of the present disclosure provides for a trouble ticket handling system. A representative system, among others, includes a login logic which can log a user into several trouble ticket systems. A representative system, among others, also includes a monitoring device to poll the trouble ticket systems for open trouble tickets, and a user interface logic to enable the user to automatically load a proper trouble ticket from any of the open trouble tickets on the trouble ticket systems.

Another preferred embodiment of the present disclosure provides methods for assigning trouble tickets. A representative method, among others, can include the following steps: periodically polling trouble ticket systems for a trouble ticket associated with a support center; sorting the trouble ticket with any previously received trouble tickets; storing the sorted trouble tickets in a memory device; receiving a request for a trouble ticket from a technician at the support center; and, providing the technician with a proper trouble ticket from the sorted trouble tickets.

Another preferred embodiment of the present disclosure provides a program for assigning a trouble ticket to a responsible technician. A representative program, among others, can perform the following steps: periodically polling trouble ticket systems for a trouble ticket associated with a support center; sorting the trouble ticket with previously received trouble tickets according to a tracking key and time stamp included with each of the trouble tickets; storing the sorted trouble tickets in a memory device; receiving a request for a trouble ticket from a technician at the support center; and, assigning the technician to a proper trouble ticket from the sorted trouble tickets.

Other systems, methods, and/or computer programs products according to embodiments will be or become apparent to one with skill in the art upon review of the following drawings and detailed description. It is intended that all such additional system, methods, and/or computer program products be included within this description, be within the scope of the present disclosure, and be protected by the accompanying claims.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

The disclosure now will be described more fully with reference to the accompanying drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

Figure 1A:
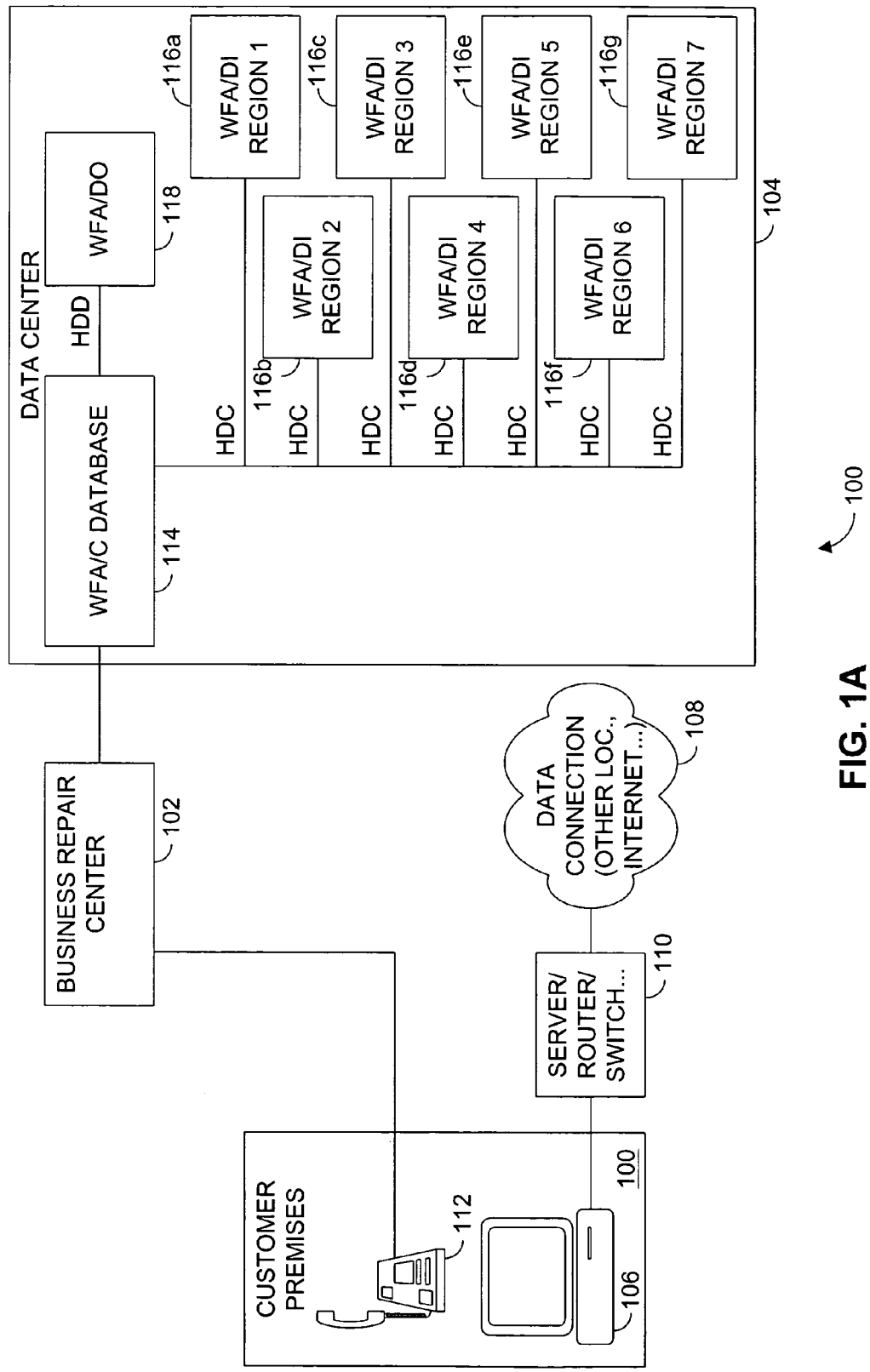
FIG. 1A is a block diagram illustrating an embodiment, among others, of a system used for receiving and entering trouble tickets.

Referring to FIG. 1, shown is an embodiment, among others, of a system for receiving trouble tickets from a customer. Shown in the system are the customer premises 100, a business repair center 102, and a data center 104. At the customer premises 100 a customer computer 106 is typically connected to a server, router, switch, etc. 110, which carries data traffic to a designated location. One skilled in the art should recognize that in the event of a regulated carrier (or an ISP using regulated lines), a line is typically connected to a CO, and is then switched through a packet network to an ISP or another data connection. The ISP or other data connection is a division of the regulated carrier in some embodiments, among others. Moreover, one skilled in the art should recognize that, in some implementations, the customer premises is connected to a far end data connection (FEDC) 108 through a digital access and cross-connect systems (DACS). The customer computer 106 typically accesses content from any server that is coupled to the FEDC 108. Sometimes, however, the customer computer 106 is unable to retrieve content from the FEDC 108 because of problems with a connection, or problems within the FEDC 108. In these instances the customer will typically use a telephone 112 to call his or her data service provider.

In an embodiment, among others, of the present disclosure, customer service request calls get routed to a business repair center 102. The business repair center 102 is typically staffed by a number of operators (not shown). Each of the operators is trained and have methods and procedures for handling customer service request calls. Typically the calls fall into one or more categories, including, among others, physical problems, logical problems, and customer premises problems. Physical problems usually result from problems with the data provider's lines or equipment 110 used for the customer's connection to the FEDC 108. Logical problems usually involve those problems at the data provider's equipment 110 that have to do with software and configuration rather than device problems. Customer premises problems typically are related to problems with the equipment that the customer is using to access the FEDC 110.

All of these problems are logged by the operators into a Work Force Administration/Control (WFA/C) database 114 at a data center 104. Interaction with the WFA/C database 114 is typically done through a mainframe IBM 3270 emulation interface (not shown) which allows the operators to enter a number of details about a problem the customer is experiencing. These details are typically collected according to the methods and procedures (or job aid) manuals distributed to each of the operators.

Upon completion of entering the trouble ticket into the WFA/C 114 database, the operator makes a decision, in accordance with the methods and procedures manual, to perform a handoff to a Work Force Administration/Dispatch In (WFA/DI) database 116a-g or a Work Force Administration/Dispatch Out (WFA/DO) database 118. The WFA/DI database 116a-g is typically used for physical and logical problems experienced by the customer, while the WFA/DO system is typically used for outside facilities or customer premises problems. As mentioned above, the operator can handoff the problem to more than one database (WFA/DI 116a-g or WFA/DO 118) based upon the problem the customer is experiencing.

The operator also typically determines the location that should handle the trouble ticket. This is typically done by pulling a record of the locations through which a particular customer receives service. Each location is typically identified using a common language location identifier (CLLI) code. Typically the methods and procedures manual also identifies the specific location to which the trouble ticket should be sent. These methods and procedures often instruct the operator to send the ticket to the facilities responsible for the physical level prior to sending it to a facility responsible for the logical level. The facilities responsible for the physical level are typically the central office and/or outside forces. The central office or outside forces check the equipment associated with the customer having problems and determine whether any physical problems exist with regard to the network, such as for example, switch alarms, disconnected cables, etc. The facility typically responsible for logical problems in the network is called the network infrastructure support center (NISC).

Figure 1B:
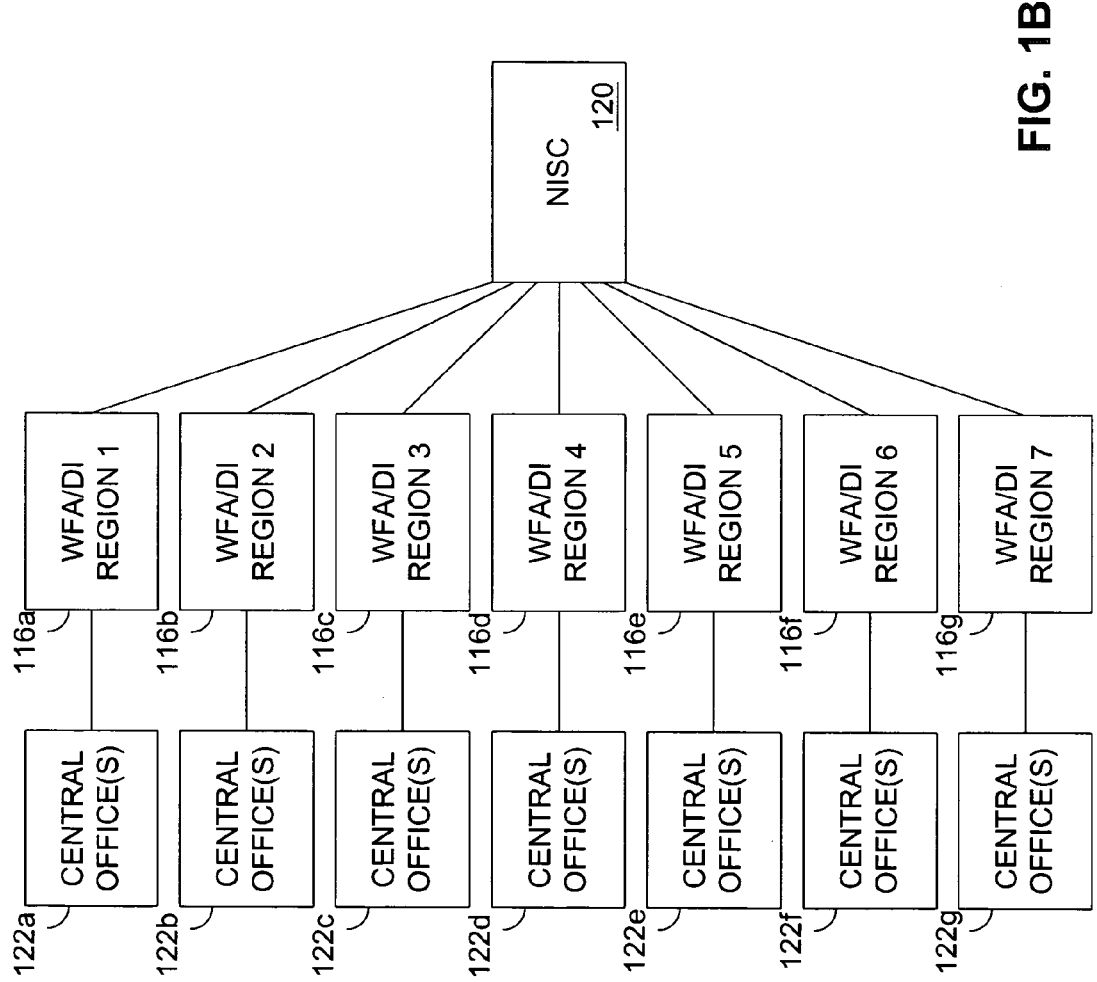
FIG. 1B is a block diagram illustrating an embodiment, among others, of a system for retrieving trouble tickets from the system shown in FIG. 1A.

Referring now to FIG. 1B, shown is the connection between the WFA/DI 116a-g and the NISC 120 and a plurality of central office groups 122a-g. It should be recognized that multiple central offices typically connect to each of the WFA/DI 116a-g. For example, central offices 122a typically include each of the central offices assigned to a particular region, and WFA/DI 116a will include a database assigned to process trouble tickets for that particular region.

Figure 1C:
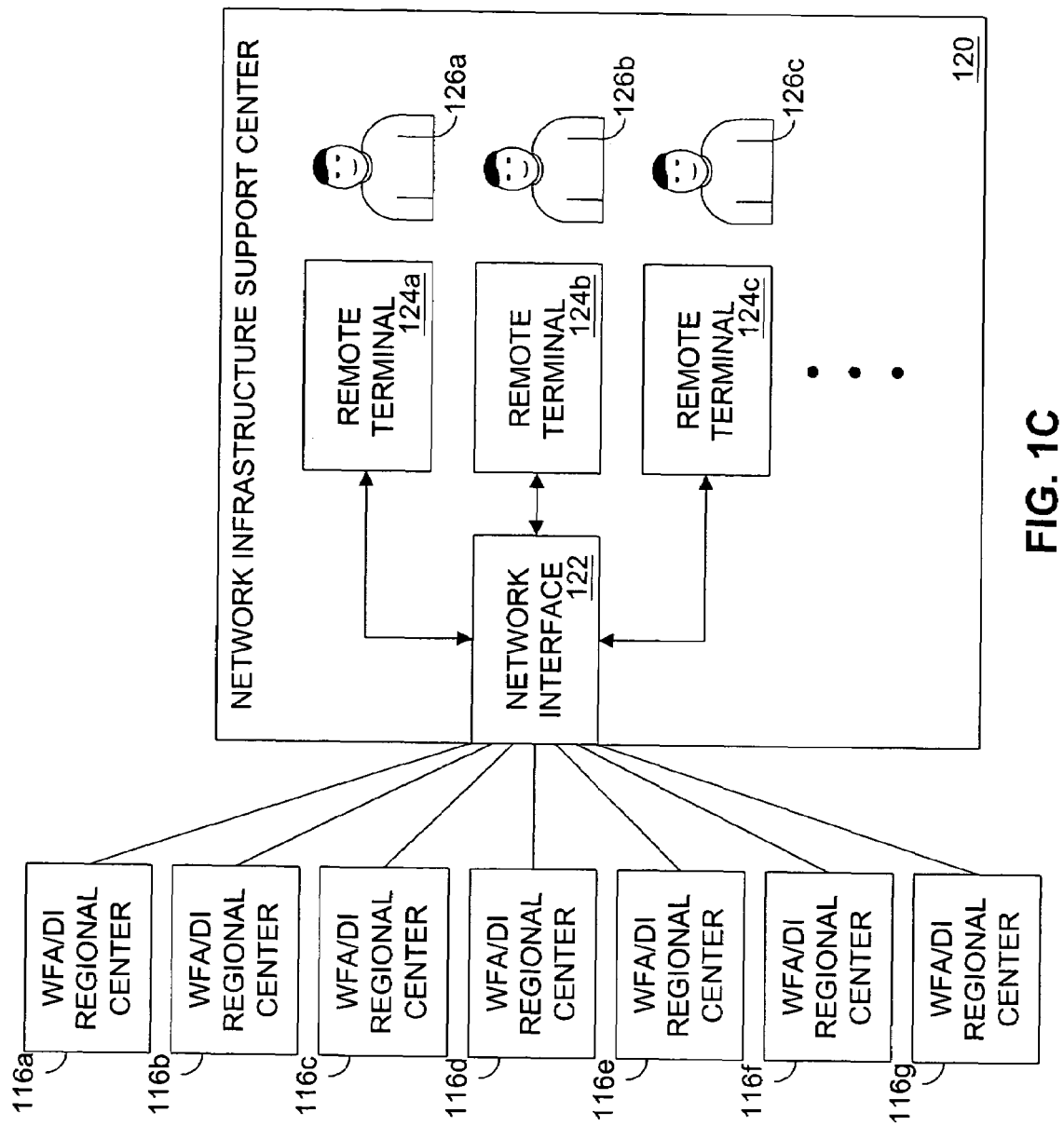
FIG. 1C is a block diagram illustrating an embodiment, among others, of a system detailing retrieval of trouble tickets by the NISC shown in FIG. 1B.

In contrast, a NISC 120 is typically assigned to handle trouble tickets regardless of region. Thus, the NISC 120 will receive trouble tickets from each of the plurality of WFA/DI databases 116a-g. Referring now to FIG. 1C, shown is a more detailed view of the NISC 120. The NISC 120 typically includes a network interface 122 such as a router, a number of terminals 124a-c (typically computers), and a number of technicians 126a-c. In the past, technicians 126a-c working at the NISC 120 have had to retrieve trouble tickets from the WFA/DI databases 116a-g by logging into each of the databases 116a-g with their username(s) and password(s), and then choosing a trouble ticket to work. Typically, a methods and procedures guide instructs the technicians 216a-c to work oldest maintenance tickets first, and then oldest installation tickets if there are no open maintenance tickets. However, viewing any of the databases 116a-g typically requires opening up a separate window for the IBM 3270 terminal emulation and logging on to the system. Because multiple windows are used, the technicians 126a-c sometimes become focused on the active window (database) at the expense of the other windows (databases). Thus, trouble tickets that may come first in priority sometimes go unnoticed. Further, when technicians do cycle through the terminal emulation window representations to determine the proper trouble ticket to which the technician should load, the technician can make mistakes. Moreover, the process of cycling through the terminal emulation window representations itself can be inefficient and wasteful. The technicians sometimes also attempt to avoid a trouble ticket because the ticket appears to be complicated.

Figure 2:
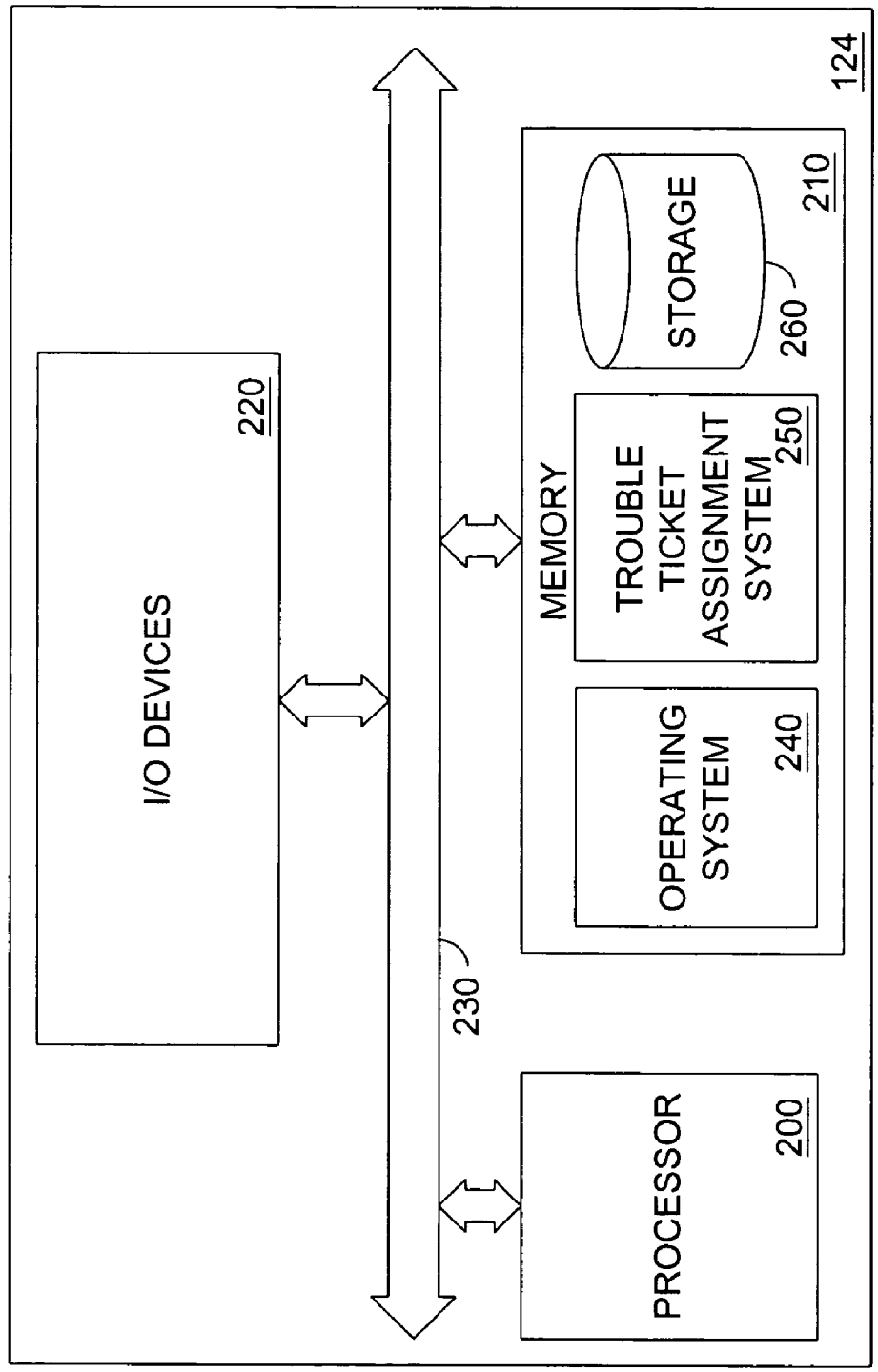
FIG. 2 is a block diagram illustrating the architecture of a computer in which an embodiment, among others, of the present disclosure is included.

Referring now to FIG. 2, shown is block diagram of a technician's computer 124 including an embodiment, among others, of the present disclosure. Generally, in terms of hardware architecture, as shown in FIG. 2, the computer 124 includes a processor 200, memory 210, and one or more input and/or output (I/O) devices 220 (or peripherals) that are communicatively coupled via a local interface 230. The local interface 230 can be, for example but not limited to, one or more buses or other wired or wireless connections, as is known in the art. The local interface 230 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 200 is a hardware device for executing software, particularly that stored in memory 210. The processor 200 can be any custom made or commercially available processor, a central processing unit (CPU), an auxiliary processor among several processors associated with the host computer 124, a semiconductor based microprocessor (in the form of a microchip or chip set), a macroprocessor, or generally any device for executing software instructions.

The memory 210 includes any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, and/or other types of storage media. Note that the memory 210 has a distributed architecture, in some implementations, where various components are situated remote from one another, but can be accessed by the processor 200.

The software in memory 210 includes one or more separate programs 240, 250, each of which comprises an ordered listing of executable instructions for implementing logical functions. In the example of FIG. 2, the software in the memory 210 includes a trouble ticket assignment system 250 and a suitable operating system (O/S) 240. A nonexhaustive list of examples of suitable commercially available operating systems 240 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; or (e) an appliance-based operating system, such as that implemented in handheld computers or personal data assistants (PDAs) (e.g., PalmOS available from Palm Computing, Inc., and Windows CE available from Microsoft Corporation). The operating system 240 essentially controls the execution of other computer programs, such as the trouble ticket assignment system 250, and provides scheduling, input-output control, file and data management, memory management, and communication control and related services.

The trouble ticket assignment system 250 include, in various embodiments, source programs, executable program (object code), script, or any other entity comprising a set of instructions to be performed. When a source program, then the program needs to be translated via a compiler, assembler, interpreter, or the like, which may or may not be included within the memory 210, so as to operate properly in connection with the O/S 240. Furthermore, the trouble ticket assignment system 250 is preferably written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 220 preferably include input devices, for example but not limited to, a keyboard, mouse, scanner, microphone, etc. Furthermore, the I/O devices 220 preferably include output devices, for example but not limited to, a printer, display, etc. Finally, the I/O devices 220 further preferably include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 124 is a PC, workstation, or the like, the software in the memory 210 may further include a basic input output system (BIOS) (omitted for simplicity). The BIOS is a set of essential software routines that initialize and test hardware at startup, start the O/S 240, and support the transfer of data among the hardware devices. The BIOS is stored in ROM so that the BIOS can be executed when the computer 124 is activated.

When the computer 124 is in operation, the processor 200 is configured to execute software stored within the memory 210, to communicate data to and from the memory 210, and to generally control operations of the computer 124 pursuant to the software. The trouble ticket assignment system 250 and the O/S 240, in whole or in part, but typically the latter, are read by the processor 200, perhaps buffered within the processor 200, and then executed.

When the trouble ticket assignment system 250 is implemented in software, as is shown in FIG. 2, it should be noted that the trouble ticket assignment systems 250 can be stored on any computer readable medium for use by or in connection with any computer related system or method. Moreover, the trouble ticket assignment system 250 can interact with a storage device 260 to store and retrieve information used in conjunction with the system 250. In the context of this document, a computer readable medium is an electronic, magnetic, optical, or other physical device or means that can contain or store a computer program for use by or in connection with a computer related system or method. The trouble ticket assignment system 250 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In one embodiment, among others, of the present disclosure, the trouble ticket assignment system 250 will be operable to log a technician into the plurality of trouble ticket systems 116a-g by saving his or her username and password in local storage 260. The trouble ticket assignment system 250 can also poll the plurality of WFA/DI databases 116a-g to determine if any open trouble tickets exist for the NISC 120. As one skilled in the art should recognize, the polling can be done based upon the CLLI code assigned to the NISC 120. Moreover, the polling in some implementations occurs on a regular basis, such as every three minutes. However, it should also be recognized that the trouble ticket assignment system could poll the WFA/DI databases each time the technician requests a new trouble ticket be loaded to his or her computer. Typically the polling is performed in the background of a graphical user interface (GUI) application, such that the technician has no view of the process(es) occurring in the background.

In some embodiments, among others, the GUI for the trouble ticket assignment system 250 includes a button representation (not shown) allowing the technician to select the button representation to automatically load a trouble ticket. Moreover, such GUI also includes a manual load field representation (not shown). The manual load field representation would allow the technician to manually load to trouble tickets for which the technician has a trouble ticket number. Further, such GUI includes a manual load explanation field (not shown) which would allow the technician to enter a reason why the manual load function was used. The manual load function would typically be used to load trouble tickets that are related to another trouble ticket on which the technician has already started working. The manual load explanation field could be used to discourage technicians from choosing trouble tickets to work, as opposed to working on the ticket on which the technician is supposed to be working. In an alternative embodiment, among others, the trouble ticket assignment system 250 can also be configured to send a notification to a supervisor when any technician has exceeded a threshold number uses of the manual load function. As one skilled in the art should understand, these functions could be used to help avoid the problem of technicians choosing a trouble ticket based upon difficulty of the ticket.

In one embodiment, among others, of the present disclosure, the GUI also includes a ticket field representation. The ticket field representation would allow the technician to view the details of a ticket that was loaded by the trouble ticket assignment system 250. The technician, upon completing a trouble ticket assignment, could also close the trouble ticket through the GUI.

Furthermore, using embodiments of the trouble ticket assignment system 250, the tickets are consistently loaded to the technician in the correct order. Moreover, in one embodiment, the tickets could be loaded based upon the maintenance ticket that arrived at any of the WFA/DI databases 116a-g first. If there are no maintenance tickets, the tickets could be loaded to the technician based upon the installation ticket that arrived at any of the WFA/DI databases 116a-g first. One skilled in the art should recognize that exist other ways to determine the proper trouble ticket which are intended to be included within the present disclosure. For example, among others, the trouble ticket assignment system could determine the proper trouble ticket based upon the fines that are levied against the regulated carriers in different states for trouble ticket pendency. As such, a regulated business may wish to have the technician work a trouble ticket from a state in which the fines are largest. One skilled in the art should understand further that the trouble ticket assignment system 250 allows more complicated algorithms than previously used, because the technicians are not required to parse the methods and procedures to determine the trouble ticket on which the technician should work. Moreover, it eliminates the inefficiencies associated with technicians determining the proper trouble ticket on which to work.

In an alternative embodiment, among others, of the present disclosure, a trouble ticket assignment system includes a connection to a scheduling database for technicians. Thus, such a trouble ticket assignment system records which trouble tickets were worked by a technician into the scheduling database. Moreover, such a trouble ticket assignment system uses the schedule to assign tickets based on a technician's availability.

Figure 3:
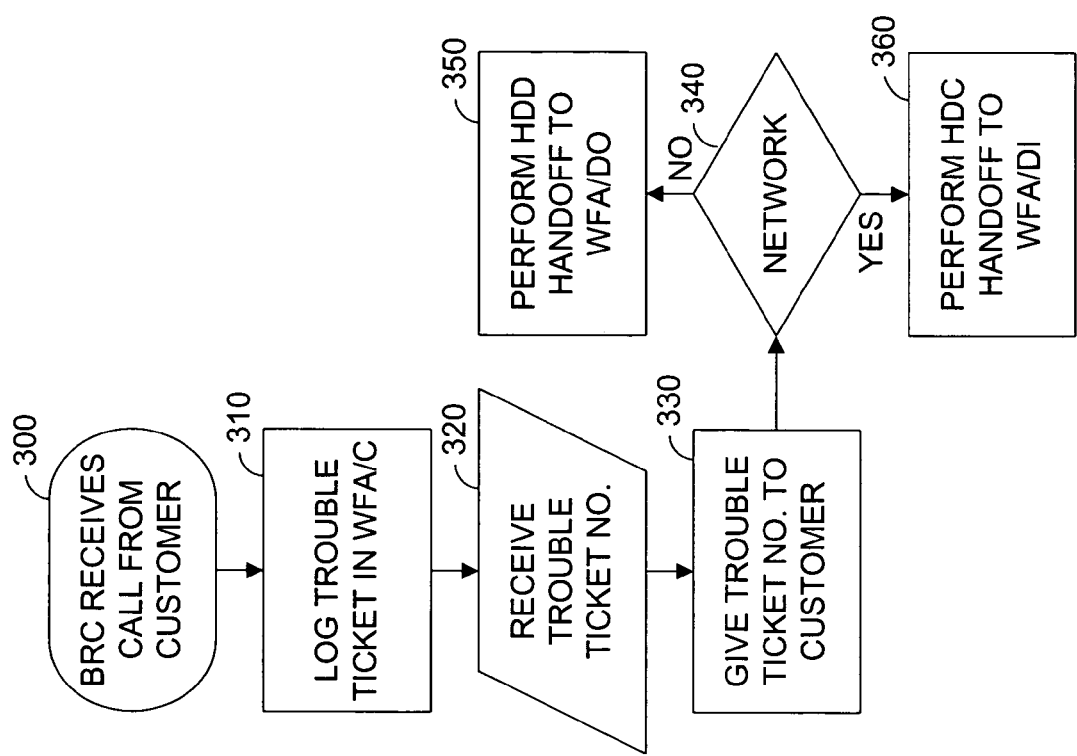
FIG. 3 is a flowchart illustrating the operation of the BRC shown in FIG. 1A.

Referring now to FIG. 3, shown is a flowchart illustrating an embodiment, among others, of the process that a BRC 102 performs upon receiving a call from a customer. In step 300, the BRC 102 receives a call from the customer. In step 310, the BRC 102 logs the trouble ticket into WFA/C 114 (FIG. 1). Logging the trouble ticket typically involves interacting with the customer to get some details of the problem that the customer is experiencing. The BRC 102 receives a ticket number related to the trouble ticket in step 320. The trouble ticket number is then given to the customer in accordance with step 330. In step 340, the BRC 102 determines whether the problem is part of the CO network, the outside plant facilities, or part of the customer premises equipment.

As shown in step 350, if the problem is not part of the CO network, the BRC 102 performs a handoff, known colloquially in the art as an "hdd" handoff, to WFA/DO database 118. In the WFA system, the "hdd" handoff occurs in one of the following forms: pending price/logging ("hdds"), pending load ("hddp"), pre-assigned ("hdda"), craft loaded ("hddl"), jeopardy ("hddj"), and pseudo entity ("hdf"). The "hdds" handoff is the first status a trouble ticket is given when it is handed off to WFA/DO. The "hddp" is the second stage of a WFA/DO handoff, the handoff was successful, but no technician has been assigned. The "hdda" handoff occurs when a technician is pre-assigned to work with a ticket, such as occurs on tickets for which appointments are made. The "hddl" handoff is the status for a ticket when a technician has been assigned to the ticket. The "hddj" handoff is the status assigned by the technician when a job is in jeopardy. The "hdf" handoff is the status used in order to stop a timer running on the ticket.

Alternatively, if the problem is part of the CO network, the BRC 102 performs a handoff to the WFA/DI database 116, as known colloquially in the art as an "hdc" handoff, as shown in step 360. In the WFA/DI system, the "hdc" handoff occurs in one of the following forms: pending load ("hdcp"), craft loaded ("hdcl"), jeopardy ("hdcj"), deferred ("hdcf"), management review ("hdcv"), and referred to WFA/DI location ("hdci"). The "hdcp" handoff is the status of a ticket in the WFA/DI system that has not yet been assigned to a technician. The "hdcl" handoff is the status of a ticket after it has been assigned to a technician. The "hdcj" handoff is used for the status of a job that is in jeopardy. The "hdcf" handoff is used for a job that has been deferred by the customer for after hours testing. The "hdcv" handoff is used for a ticket that is being reviewed for management of the ticket. The "hdci" handoff is used in situations where the ticket is referred to the WFA/DI system.

Figure 4:
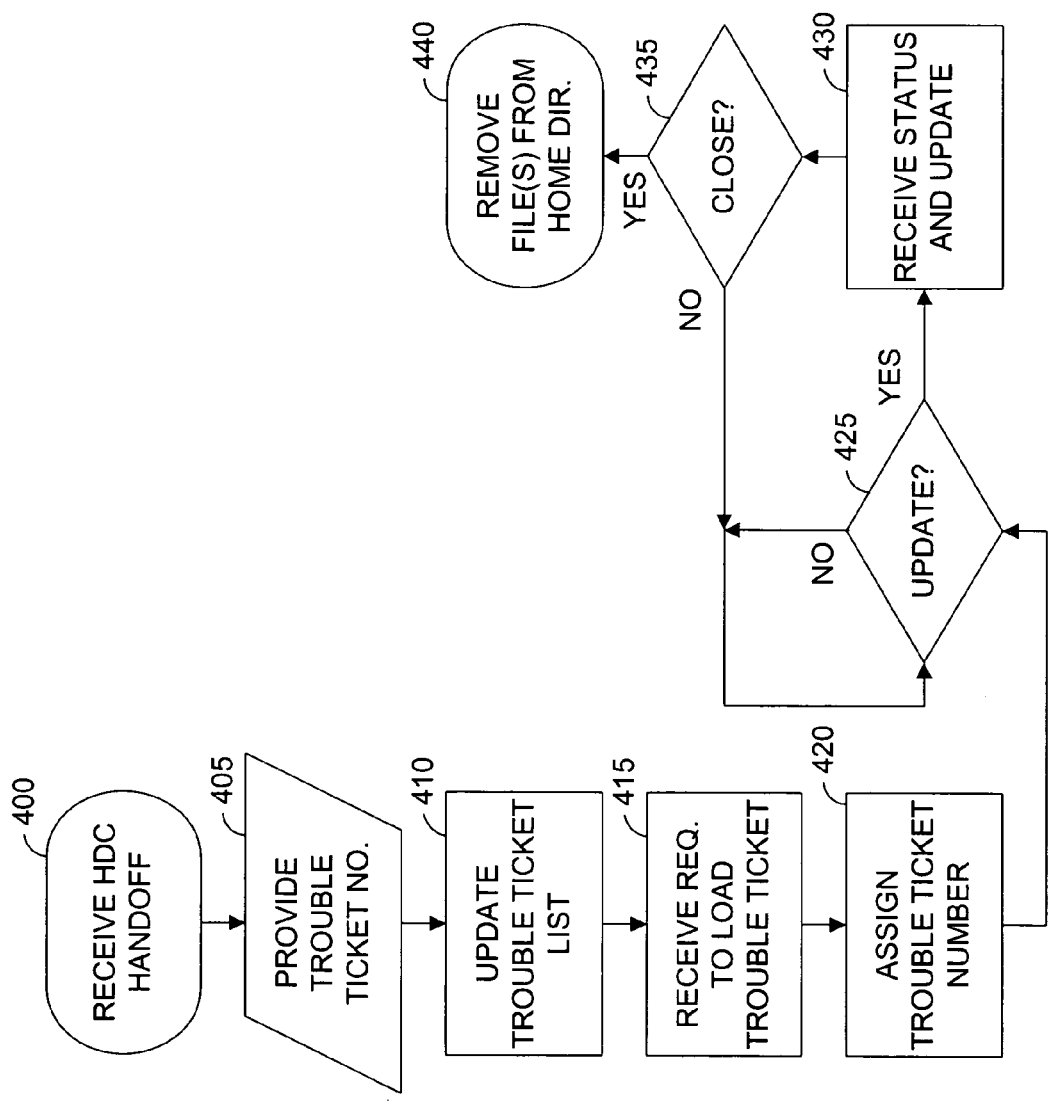
FIG. 4 is a flowchart illustrating the operation of the WFA/DI system shown in FIG. 1B.

Referring now to FIG. 4, shown is an embodiment, among others, of the process performed at a WFA/DI database 116. In step 400, the WFA/DI database 116 receives an "hdc" handoff from WFA/C 114. The WFA/DI database 116 then provides a trouble ticket number to the WFA/C database 114 in step 405. Typically the trouble ticket number is based on the day of the year, the type of trouble, and the number of tickets that have come before that trouble ticket that day. In step 410, the trouble ticket list is updated to include the ticket just handed-off from the WFA/C database 114. The database 116, in step 415, receives a request to load a trouble ticket to a technician 126 from the technician 126. In step 420, the database 116 assigns a trouble ticket number to the technician 126. The database 116, in step 425, determines if a status update has been requested by the technician 126. In the event that no status update has been requested, the database continues to check for a status update in step 425. If a status update request is received, the database receives the updated status in step 430. In step 435, the database 116 determines whether the technician 126 instructed that the trouble ticket be closed. If the technician 126 did not request the trouble ticket to be closed, the database 116 returns to step 425 and waits for a further update. However, if the technician 126 requested that the trouble ticket be closed, in step 440, the trouble ticket is closed by the WFA/DI database 116.

Figure 5:
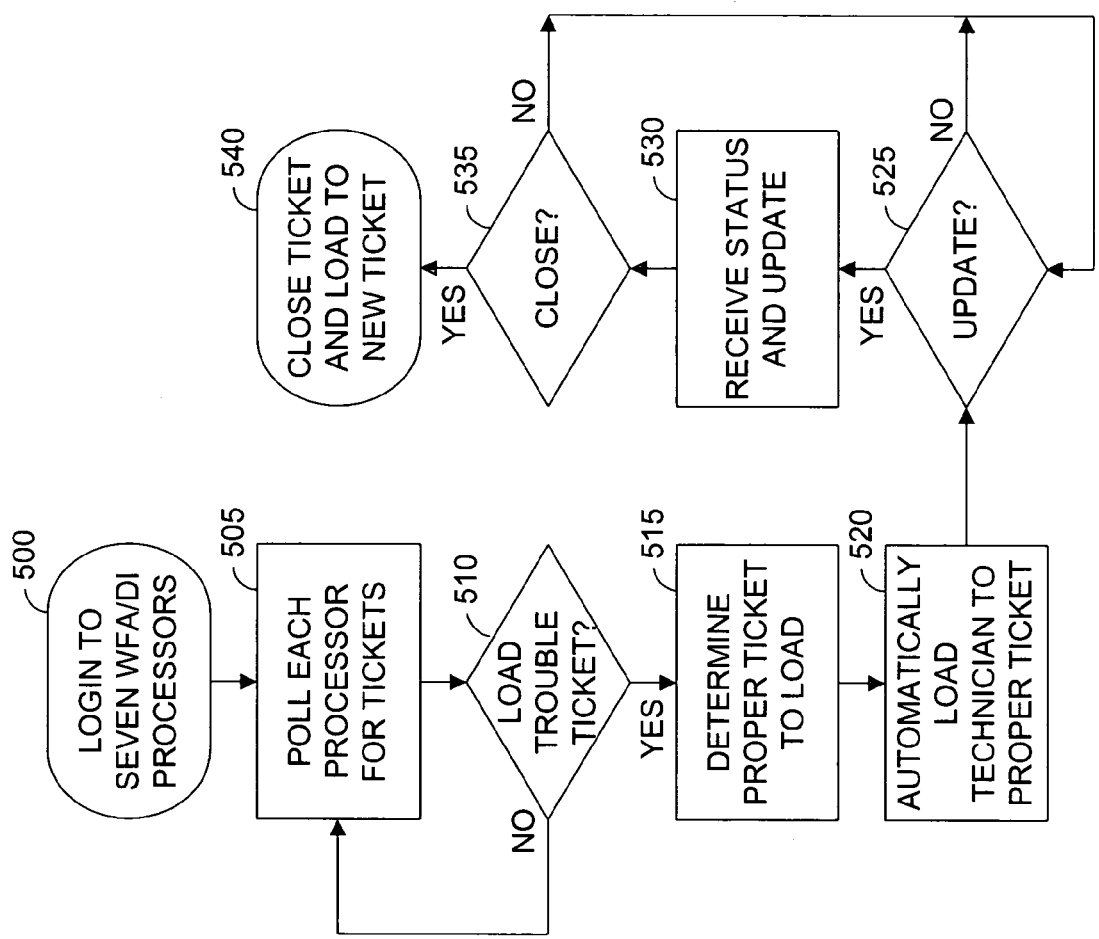
FIG. 5 is a flowchart illustrating the operation of an embodiment, among others, of a trouble ticket handling system used by the NISC of FIG. 1C.

Referring now to FIG. 5, shown is a flowchart illustrating the operation of an embodiment, among others, of the trouble ticket assignment system 250. In step 500, the system 250 logs the technician 126 into a plurality of trouble ticket systems (WFA/DI databases) 116*a-g*. The login process typically involves providing a username and password to the plurality of trouble tickets systems 116*a-g*. In some implementations, the username and password are stored in the trouble ticket assignment system such that the user is not required to provide his or her username and password each time the trouble ticket assignment system 250 is opened. In step 505, the system 250 begins polling the plurality of trouble ticket systems 116*a-g* for open trouble tickets. In this embodiment, among others, the system 250 continues to poll the trouble ticket systems 116 until the technician 126 requests to load a trouble ticket, as shown in step 510. If the technician 126 has requested to load a new trouble ticket, in step 515, the system 250 determines the proper trouble ticket to load. In step 520, the system 250 automatically loads the trouble ticket to the technician 126 by sending a request to the trouble ticket system 116*a-g* which the ticket came from, to assign the trouble ticket to the technician 126 using the trouble ticket assignment system 250. The trouble ticket assignment system 250 typically allows the technician 126 to work the problem, and thus, in accordance with step 525, the trouble ticket assignment system 250 waits for a request to update status from the technician 126.

Upon receiving a request to update status from the technician 126, the trouble ticket assignment system 250 receives update status information from the technician 126 in accordance with step 530. If the update status information includes a request to close the trouble ticket in step 535, the trouble ticket assignment system 250 will send a request to the WFA/DI database 116*a-g* to close the ticket along with the updated status, in accordance with step 540. However, if the technician 126 does not include a request to close the trouble ticket in step 535, the trouble ticket assignment system 250 returns to step 525 to await a request to update status from the technician 126. In one embodiment, among others, of the present disclosure, the trouble ticket assignment system 250 is configured to load a new trouble ticket to the technician upon the technician 126 closing the previous trouble ticket.

Figure 6:
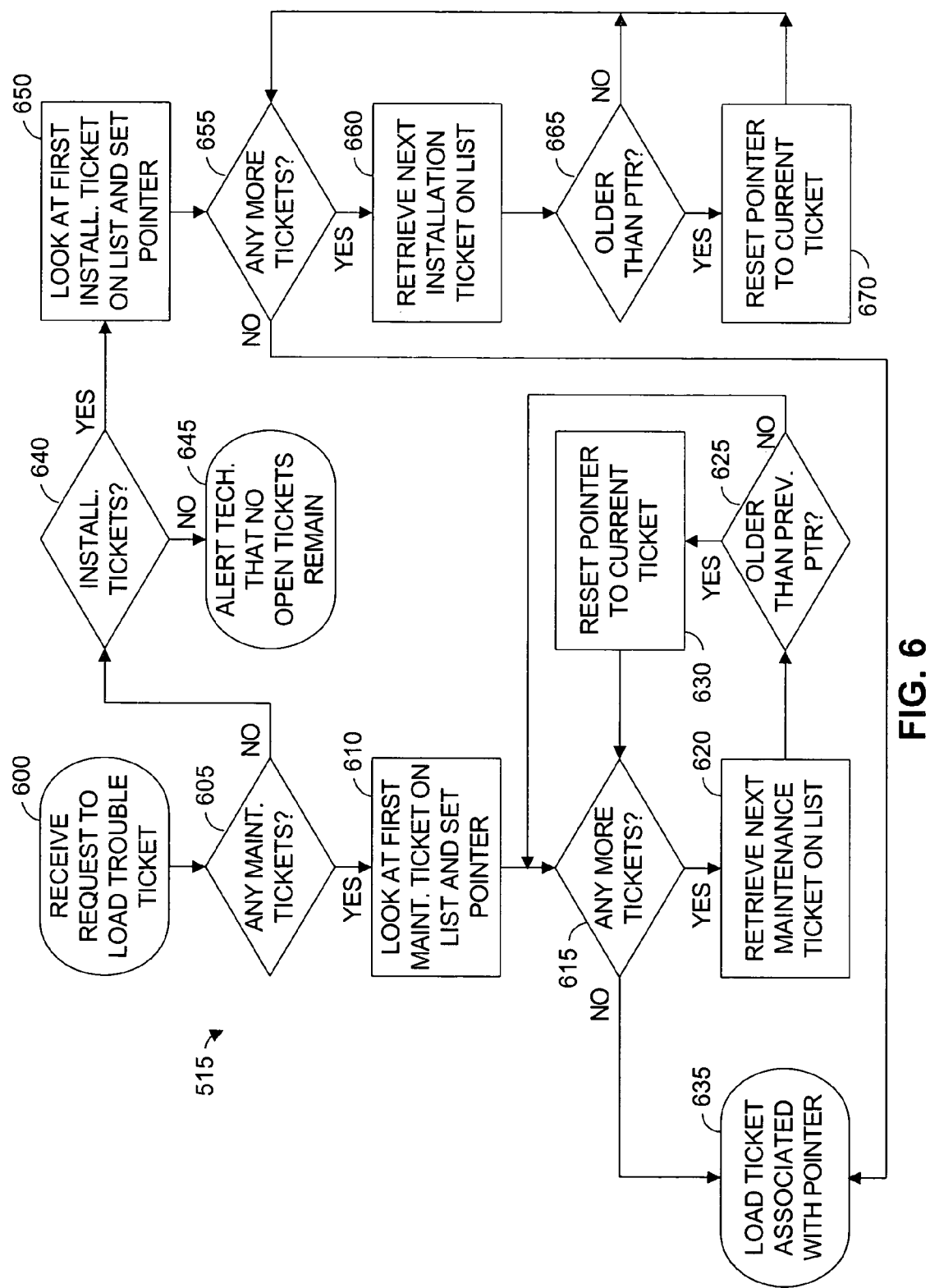
FIG. 6 is a flowchart illustrating the operation of an embodiment, among others, of an algorithm for determining the proper trouble ticket to load in FIG. 5.

Referring now to FIG. 6, shown is a flowchart of a method for determining the proper trouble ticket in accordance with an embodiment, among others, of the present disclosure. In step 600, the trouble ticket assignment system receives a request to load a new trouble ticket. Upon receiving the request to load the new trouble ticket, the trouble ticket assignment system determines whether any maintenance tickets are present in step 605. This is typically done by examining the tracking key associated with each of the trouble tickets. Tracking keys for maintenance tickets typically comprise a six character alphanumeric field with two letters identifying the location and the next four characters are a numeric value assigned by the WFA/C database when the ticket is opened.

If there are maintenance trouble tickets, the trouble ticket assignment system 250 sets a pointer to keep track of the first maintenance trouble ticket available, in accordance with step 610. In step 615, the trouble ticket assignment system determines whether there are any more maintenance tickets that have been identified from the polling. If there are more maintenance tickets, the trouble ticket assignment system 250 then retrieves the next maintenance trouble ticket in step 620. The trouble ticket assignment system 250 then determines whether the retrieved maintenance trouble ticket has an earlier time stamp than the time stamp on the trouble ticket associated with the pointer as shown in step 625. If the time stamp of the retrieved ticket is earlier than the ticket associated with the point, the pointer is reset in accordance with step 630. The trouble ticket assignment system then returns to step 615 and determines whether any maintenance trouble tickets remain. If the time stamp of the retrieved ticket is not earlier than the ticket associated with the pointer, the trouble ticket assignment system returns to step 615 and determines whether any maintenance trouble tickets remain. The trouble ticket assignment system continues this loop until all maintenance trouble tickets have been examined. The trouble ticket assignments system then loads the trouble ticket associated with the pointer to the technician requesting the trouble ticket in accordance with step 635.

Referring back to step 605, if there are no maintenance tickets available, the trouble ticket assignment system determines whether there are any installation tickets available in step 640. If there are no installation trouble tickets available, the trouble ticket assignment system sends an alert to the technician that there are no tickets available in step 645. However, if there are installation tickets available, in step 650, the trouble ticket assignment system 250 sets a pointer to the first trouble installation trouble ticket. The trouble ticket assignment system 250 then determines whether there are any more installation tickets in step 655. If there are not any more installation trouble tickets, the trouble ticket assignment system loads the trouble ticket associated with the pointer to the technician 126.

However, if there are more installation trouble tickets, the trouble ticket assignment system 250 begins a loop to find the oldest trouble ticket. In step 660, the trouble ticket assignment system 250 retrieves the next installation trouble ticket. The trouble ticket assignment system 250 then determines whether a time stamp associated with the retrieved trouble ticket is earlier than a time stamp associated with the trouble ticket associated with the pointer in step 665. If the trouble ticket retrieved has an earlier time stamp than the trouble ticket associated with the pointer, in step 670, the trouble ticket assignment system 250 resets the pointer to be associated with the retrieved trouble ticket. The trouble ticket assignment system 250 then returns to step 655 to determine whether any more installation trouble tickets remain. Similarly, if the time stamp of the retrieved trouble ticket is not earlier than the time stamp of the trouble ticket associated with the pointer, the trouble ticket assignment system 250 will return to step 655 to determine whether any trouble tickets remain. Upon examination of all of the trouble tickets, the trouble ticket assignment system could load the trouble ticket to the technician 126 in accordance with step 635.

One skilled in the art should recognize that the trouble tickets may also be sorted according to a sorting algorithm during the polling process, and prior to the technician 126 requesting the retrieval of a trouble ticket. In this way, the system would merely load the technician to the first trouble ticket on the list, since the tickets have been pre-sorted according to the algorithm specified by the programmer or the supervisor. This would reduce processing time for loading a trouble ticket upon the technician 126 selecting to load a new trouble ticket.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should also be emphasized that the above-described embodiments of the present disclosure are merely possible examples of implementations set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and the present disclosure and protected by the following claims.

What is claimed is:

1. A trouble ticket handling system including a processor, comprising:
   login logic configured to log a user into a plurality of trouble ticket systems, wherein each trouble ticket system services a different geographic region;
   a monitoring device configured to poll the plurality of trouble ticket systems for information relating to open trouble tickets in each of the trouble ticket systems; and
   user interface logic configured to enable the user to automatically load a proper trouble ticket from any of the plurality of open trouble tickets at the plurality of trouble ticket systems and assign the proper trouble ticket to the user, determination of the proper trouble ticket being based upon regulatory fines that are subject to being levied against the proper trouble ticket from different regulatory agencies within the different geographic regions, wherein the proper trouble ticket is subject to cause issuance of a regulatory fine from the regulatory agency in which the regulatory fine is the largest for trouble ticket pendency.

2. The system of claim 1, further comprising memory coupled to the login logic, the memory being configured to store at least one password associated with each of the plurality of trouble ticket systems, and to store and a username associated with the user.

3. The system of claim 2, wherein each of said at least one password is different and each of said at least one password is associated with one of the plurality of trouble ticket systems.

4. The system of claim 1, wherein the monitoring device is configured to poll the plurality of trouble ticket systems on a periodic basis.

5. The system of claim 1, wherein the monitoring device is configured to poll the plurality of trouble ticket systems upon receiving an instruction from the user interface logic.

6. The system of claim 1, wherein the monitoring device is configured to retrieve information from each of the plurality of trouble ticket systems regarding a plurality of open trouble tickets associated with the user.

7. The system of claim 6, wherein the trouble tickets are associated with the user through a common language location identifier based on a center associated with the user.

8. The system of claim 1, further comprising sorting logic configured to determine the proper trouble ticket to load to the user.

9. The system of claim 8, wherein the sorting logic is configured to sort a plurality of trouble tickets responsive to a common language location identifier, a tracking key, and a time stamp associated with each of the plurality of trouble tickets.

10. The system of claim 8, wherein the sorting logic is further configured to sort a plurality of trouble tickets responsive to a tracking key associated with each of the plurality of trouble tickets.

11. The system of claim 1, wherein the user interface logic inhibits the user from choosing a trouble ticket to work on based on a perceived level of difficulty associated with the chosen trouble ticket.

12. The system of claim 1, wherein the user interface logic is further configured to enable the user to manually load to a trouble ticket.

13. The system of claim 12, wherein the user interface logic is further configured to enable the user to enter a reason for manually loading the trouble ticket.

14. The system of claim 13, wherein the user interface logic is further configured to set an alarm when the user exceeds a threshold number of allowable manual load tickets.

15. The system of claim 14, further comprising a reporting logic configured to report the alarm to a supervisor of the user.

16. The system of claim 1, wherein the proper trouble ticket is determined by a sorting logic which is configured to provide the user interface with an oldest maintenance ticket as determined by a tracking key associated with each of the plurality of trouble tickets.

17. A method of assigning trouble tickets, comprising:
   periodically polling a plurality of trouble ticket systems for at least one trouble ticket associated with a support center, wherein each trouble ticket system services a different geographic region;
   sorting said at least one trouble ticket with a plurality of previously received trouble tickets;

storing a plurality of sorted trouble tickets in a memory device;

receiving a request for a trouble ticket from a technician at the support center; and providing the technician with a proper trouble ticket from the plurality of sorted trouble tickets, determination of the proper trouble ticket being based upon regulatory fines that are subject to being levied against the proper trouble ticket from different regulatory agencies from the different geographic regions, wherein the proper trouble ticket is chosen from the regulatory agency in which issuance of a regulatory fine for trouble ticket pendency is the largest.

18. The method of claim 17, further comprising:
storing at least one password for the technician associated with each of the plurality of trouble ticket systems in the memory device.

19. The method of claim 18, further comprising logging the user into the plurality of trouble ticket systems with said at least one password.

20. The method of claim 18, wherein each of said at least one password is different and each of said at least one password is associated with one of the plurality of trouble ticket systems.

21. The method of claim 17, further comprising polling of the plurality of trouble ticket systems occurs upon receiving a request for a trouble ticket from a technician at the support center.

22. The method of claim 17, wherein the trouble tickets are associated with the support center through a common language location identifier associated with the support center.

23. The method of claim 22, wherein sorting said at least one trouble ticket with a plurality of previously received trouble tickets comprises sorting trouble tickets in accordance with a tracking key, and a time stamp associated with each trouble ticket.

24. The method of claim 17, wherein the user interface logic inhibits the user from choosing a trouble ticket to work on based on a perceived level of difficulty associated with the chosen trouble ticket.

25. The method of claim 17, further comprising:
receiving a request from the technician to manually load a trouble ticket; and
assigning the trouble ticket to the technician responsive to the request to manually load the trouble ticket.

26. The method of claim 25, further comprising receiving a reason from the technician for manually loading the trouble ticket.

27. The method of claim 26, further comprising causing an alarm when the technician exceeds a threshold number of allowable manual load tickets.

28. The method of claim 27, further comprising reporting the alarm to a supervisor of the technician.

29. A computer readable storage medium having a program for assigning a trouble ticket to a responsible technician, the program having instructions to perform:
periodically polling a plurality of trouble ticket systems for at least one trouble ticket associated with a support center, wherein each trouble ticket system services a different geographic region;

sorting said at least one trouble ticket with a plurality of previously received trouble tickets responsive to a tracking key and time stamp included with each of the trouble tickets;

storing a plurality of sorted trouble tickets in a memory device;

receiving a request for a trouble ticket from a technician at the support center; and assigning the technician to a proper trouble ticket from the plurality of sorted trouble tickets, determination of the proper trouble ticket being based upon regulatory fines that are subject to being levied against the proper trouble ticket from different regulatory agencies from the different geographic regions, wherein the proper trouble ticket is chosen from the regulatory agency in which issuance of a regulatory fine for trouble ticket pendency is the largest.

30. The program of claim 29, further performing:
storing at least one password for the technician associated with each of the plurality of trouble ticket systems in the memory device.

31. The program of claim 30, wherein each of said at least one password is different and each of said at least one password is associated with one of the plurality of trouble ticket systems.

32. The program of claim 29, further performing:
polling of the plurality of trouble ticket systems occurs upon receiving a request for a trouble ticket from a technician at the support center.

33. The program of claim 29, wherein the trouble tickets are associated with the support center through a common language location identifier associated with the support center.

34. The program of claim 29, wherein the user interface logic inhibits the user from choosing a trouble ticket to work on based on a perceived level of difficulty associated with the chosen trouble ticket.

35. The program of claim 29, further performing:
receiving a request from the technician to manually load a trouble ticket; and
assigning the trouble ticket to the technician responsive to the request to manually load the trouble ticket.

36. The program of claim 35, further performing:
receiving a reason from the technician for manually loading the trouble ticket.

37. The program of claim 36, further performing:
causing an alarm when the technician exceeds a threshold number of allowable manual load tickets.

38. The program of claim 37, further performing:
reporting the alarm to a supervisor of the technician.

39. The program of claim 29, the program being further performing:
tracking a plurality of work schedules associated with a plurality of technicians.

40. The program of claim 39, the program being further performing:
assigning the trouble ticket responsive to a work schedule among the plurality of work schedules, associated with the technician.

* * * * *